G. Smith.
Hold-Back.
Nº 63,964. Patented Apr. 16, 1867.
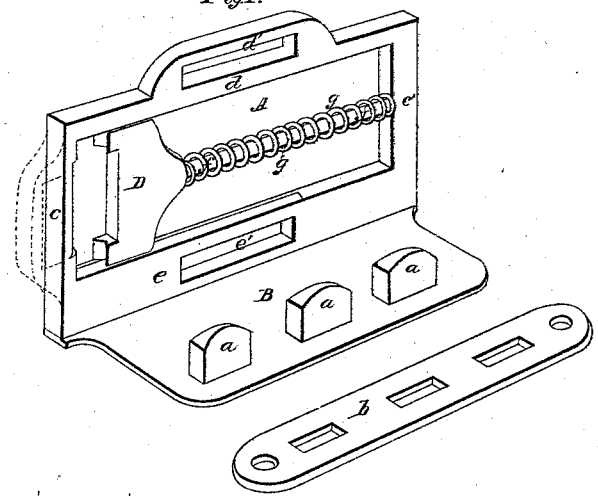
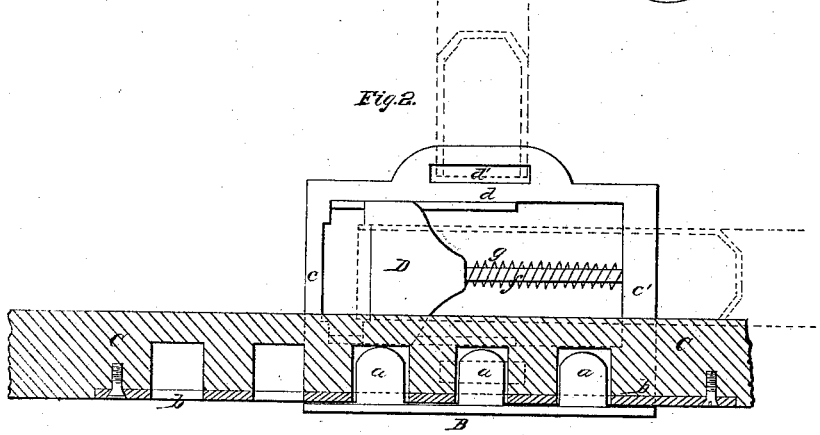
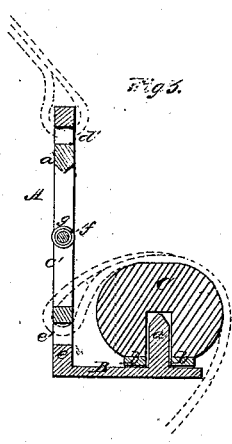
Witnesses:
Inventor:
Geo. Smith
by
Mason, Fenwick & Lawrence

United States Patent Office.

GEORGE SMITH, OF PROVIDENCE, RHODE ISLAND.

Letters Patent No. 63,954, dated April 16, 1867.

---

IMPROVEMENT IN DRAUGHT-PLATES.

---

*The Schedule referred to in these Letters Patent and making part of the same.*

---

TO ALL WHOM IT MAY CONCERN:

Be it known that I, GEORGE SMITH, of Providence, in the county of Providence, and State of Rhode Island, have invented a new and improved Draught-Plate; and I do hereby declare that the following is a full, clear, and exact description thereof, reference being had to the accompanying drawings, making a part of this specification, in which—

Figure 1 is a perspective view of a right-hand draught-plate.

Figure 2 shows the draught-plate with one thill applied to it, through which latter a central section is taken.

Figure 3 is a vertical transverse section through the draught-plate and thill.

Similar letters of reference indicate corresponding parts in the several figures.

This invention relates to certain novel improvements on the construction of devices which are designed for facilitating the hitching of a horse to a vehicle, and the unhitching of the horse therefrom. Said devices are adapted for having permanently fastened to them the breeching or hold-back straps, the breast straps, and the belly-bands, so that, by a simple attachment of the thills to the devices, and the fastening of the belly-band, the animal will be hitched to a vehicle.

The nature of my invention consists in constructing such hitching devices in a more substantial manner than hitherto, so that they will be safer to use, and present a much neater appearance, by providing for supporting and fastening each thill upon a plate, which projects at right angles from a skeleton plate, to which the harness straps are applied; also, to provide for the use and attachment of a breeching or hold-back strap when an elastic or yielding attachment for the breast strap is employed, as will be hereinafter described.

To enable others skilled in the art to understand my invention, I will describe its construction and operation.

In the accompanying drawings, A represents a skeleton plate, to which the straps of the harness are attached; as will be hereinafter described; and B is a plate, which projects out horizontally from the lower edge of plate A, as shown in figs. 1 and 3. This plate B is constructed with several tenons or lugs $a\,a\,a$, projecting from its upper surface near its outer edge, which lugs enter recesses formed in the bottom edge of the thills C, as shown in figs. 2 and 3. There is a plate, $b$, having a number of slots through it for receiving lugs $a\,a\,a$, secured firmly to the bottom of the thill C, for strengthening this thill, and protecting it from rapid wear. This plate $b$ may have a greater number of holes through it than there are lugs $a\,a\,a$, so as to adapt it for receiving these lugs in different holes, according to the size of the animal to be hitched in the vehicle; or, in other words, the supplemental holes admit of the hitching of a horse nearer to, or further from, the thill bar, as may be required. The plate A has an oblong rectangular opening through it, which leaves the upright bars $c\,c'$, the cross-bar $d$, with its oblong slot $d'$, and the lower bar $e$, with its oblong slot $e'$. Within this opening is a vertical sliding head, D, the ends of which have V grooves formed in them for receiving the V slide-ways, which are formed on the upper and lower edges of the bars $d$ and $e$. This sliding head D is perforated, for receiving loosely the rod $f$, which is secured firmly at one end to the upright bar $c'$, and which receives around it a strong helical spring, $g$, as clearly shown in figs. 1 and 2 of the drawings. This spring forces the head D backward, or toward the bar $c$, and affords ease to the horse while drawing the vehicle, by preventing his feeling jars and concussions upon his breast, as the rear end of the breast strap or collar is attached to this sliding head, as indicated in red, fig. 2. The back-band or pad is buckled to the top of the plate A at the point marked $d'$, and the billet is buckled to the plate A at $e'$ by passing this strap over the shaft or thill C, as indicated in red, fig. 3, so as to secure the thill firmly down in its place upon the plate B, which strap is the only one requiring to be fastened and unfastened to complete the hitching or unhitching. The hold-back strap is carried forward and attached to the bar $c$, or to an eye formed in an offset on this bar, as indicated in red lines, fig. 1. The hitching device which I have represented is adapted for the right-hand side of a horse. The other device, which is used on the left-hand side of the horse, is constructed for receiving the left-hand shaft or thill. In every other particular it is like the device represented and described.

I am aware that there are hitching and unhitching devices which operate very much upon the general principle of mine; but in construction the hitching device which I have described and represented differs from others in several very important particulars. The thills are supported directly upon strong plates B, to which they are attached by a number of lugs or tenons $a$ entering these thills, and also by means of the strap which is passed under the horse, over the thills, and attached below the top of these thills, as shown and described. This prevents the thills from being twisted or strained in consequence of using them to draw by, instead of traces, and also affords a very strong and substantial fastening.

Having described my invention, what I claim as new, and desire to secure by Letters Patent, is—

1. The construction of the open or skeleton plate A, with a horizontal thill-supporting shelf, B, formed on its lower edge, and two or more tenons or lugs $a\ a$, for receiving openings in the bottom of a thill, substantially as described.

2. The longitudinally sliding head D, fixed guide-rod $f$, and central spring $g$, applied to the right-angular draught-plate A B, substantially as described.

3. The two slots $d'$ and $e'$, when arranged on each side of the sliding head D of the draught-plate A B, as described and for the purposes set forth.

4. The combination of slotted bars $d$ and $e$, upright bars $c$ and $c'$, and shelf B, constructed of one piece of metal, and adapted to serve the improved purposes described.

GEORGE SMITH.

Witnesses:
 ISAAC JOHNSON,
 E. G. WILEY.